(12) United States Patent
Naka et al.

(10) Patent No.: US 6,512,520 B1
(45) Date of Patent: Jan. 28, 2003

(54) APPARATUS FOR AND METHOD OF TRANSMITTING AND RECEIVING DATA STREAMS REPRESENTING 3-DIMENSIONAL VIRTUAL SPACE

(75) Inventors: Toshiya Naka, Osaka (JP); Yoshiyuki Mochizuki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/115,503

(22) Filed: Jul. 15, 1998

(30) Foreign Application Priority Data

Jul. 31, 1997 (JP) ............................................. 9205857

(51) Int. Cl.$^7$ ............................................. G06T 17/00
(52) U.S. Cl. ....................................... 345/473; 345/474
(58) Field of Search ................................. 345/473, 474, 345/975; 709/231, 205

(56) References Cited

U.S. PATENT DOCUMENTS 6,151,634 A * 11/2000 Glaser et al. ................ 709/236
6,219,045 B1 * 4/2001 Leahy et al. ................ 709/204

FOREIGN PATENT DOCUMENTS

JP 10-40418 2/1998

OTHER PUBLICATIONS

Wingbermuehle, J. et al. "Highly realistic modeling of persons for 3D videoconferencing systems". IEEE First World Conference on Multimedia Signal Processing. ISBN 0–7803–3780–8. 1997.*
English Language Abstract of JP No. 10–40418.

* cited by examiner

Primary Examiner—Cliff N. Vo
(74) Attorney, Agent, or Firm—Greenblum & Bernstein, P.L.C.

(57) ABSTRACT

An apparatus for and a method of transmitting and receiving data streams representing 3-dimensional virtual space, the apparatus comprising: a transmitting member; a receiving member; and a transfer member for connecting the transmitting member and the receiving member in bidirectional manner; wherein a shape data stream, a motion data stream and an audio data stream representing a shape and a motion of a skeletal structure in 3-DCG and a sound synchronous with the motion, respectively are transmitted to the receiving member from the transmitting member such that the receiving member generates the 3-DCG through synchronization of the motion data stream and the audio data stream.

19 Claims, 15 Drawing Sheets

Fig.6

| Description (Kinds and info of stream,etc.) | AvatarName (Name and ID of avatar,etc.) | SkeletonName (Name and ID of skeleton,etc.) | Source (VRML node) | StartPosition |

| StartOrientation | StopPosition | StopOrientation |

Fig.7

| Description (Kinds and info of stream,etc.) | RepeatNumber | Pitch (Pitch of motion reproduction) | StartTime | StopTime | URN (State of motion data) |

Fig.11

| | | Translation X | Translation Y | Translation Z | Rotation X | Rotation Y | Rotation Z |
|---|---|---|---|---|---|---|---|
| | Root | | | | | | |
| R1 { | JR1—1 Right groin | Rot. X | Rot. Y | Rot. Z | | | |
| | JR1—2 Right knee | Rot. X | Rot. Y | Rot. Z | | | |
| | JR1—3 Right ankle | Rot. X | Rot. Y | Rot. Z | | | |
| R2 { | JR2—1 Left groin | Rot. X | Rot. Y | Rot. Z | | | |
| | JR2—2 Left knee | Rot. X | Rot. Y | Rot. Z | | | |
| | JR2—3 Left ankle | Rot. X | Rot. Y | Rot. Z | | | |
| R3 { | JR3—1 Pelvis | Rot. X | Rot. Y | Rot. Z | | | |
| R31 { | JR31—1 Right nape | Rot. X | Rot. Y | Rot. Z | | | |
| | JR31—2 Right shoulder | Rot. X | Rot. Y | Rot. Z | | | |
| | JR31—3 Right elbow | Rot. X | Rot. Y | Rot. Z | | | |
| | JR31—4 Right wrist | Rot. X | Rot. Y | Rot. Z | | | |
| R32 { | JR32—1 Left nape | Rot. X | Rot. Y | Rot. Z | | | |
| | JR32—2 Left shoulder | Rot. X | Rot. Y | Rot. Z | | | |
| | JR32—3 Left elbow | Rot. X | Rot. Y | Rot. Z | | | |
| | JR32—4 Left wrist | Rot. X | Rot. Y | Rot. Z | | | |
| R32 { | JR33—1 Neck | Rot. X | Rot. Y | Rot. Z | | | |

Repetition of this data downwardly (Number of necessary frames)

```
# VRML V2.0 utf8
Transform {
    Translation   1.0  2.0  3.2
    Rotation        1   0   0   1.5
    Children  [
        Shape  {
            Material
            ......
            ..
        }
        Shape  {
            Material
            ......
            ..
        }
    ]
}
```

APPARATUS FOR AND METHOD OF TRANSMITTING AND RECEIVING DATA STREAMS REPRESENTING 3-DIMENSIONAL VIRTUAL SPACE

BACKGROUND OF THE INVENTION

1. Field of the Invention

The present invention relates to a system for transmitting and receiving data streams for forming 3-dimensional virtual space displayed by 3-dimensional computer graphics (referred to as "3-DCG", hereinafter) based on a network such as the Internet and more particularly, to an apparatus for and a method of transmitting and receiving data streams representing a 3-dimensional skeletal structure so as to efficiently transmit and receive natural motions of a character having a complicated skeletal structure, e.g., a human being.

2. Description of the Prior Art

In recent years, virtual malls, electronic commerce and various relevant home pages on the Internet such as World-Wide Web (WWW) attract considerable attention as an applicable field of 3-DCG. Especially, thanks to rapid development of the Internet, the trend towards easy handling of relatively high-quality 3-DCG such as games and movies at home is gaining momentum. As shown in FIG. 8, a plurality of machines called "clients" PCC1–PCCn, e.g., personal computers are connected to a machine called "Server" PCS, e.g., a personal computer or a workstation through the Internet in WWW or the like. By restructuring information such as sounds, texts and layout information downloaded from the server PCS as necessary, the information transmitted from the server PCS can be obtained by the clients PCC1–PCCn. Usually, a communication method based on Transmission Control Protocol/Internet Protocol (TCP/IP) is employed for communication between the server PCS and the clients PCC1–PCCn.

Conventionally, data supplied from the server PCS has been mainly restricted to text data and image data. However, recent progress of standardization of the Virtual Reality Modeling Language (VRML) and browser of the VRML has given an impetus to transfer of 3-DCG itself such as shapes and scenes. The VRML referred to above is described below-briefly. In a known data layout consisting mainly of images and texts as in the Hypertext Markup Language (HTML), tremendous time and cost are necessary for transferring image data, especially, data on moving picture. Therefore, in existing apparatuses, there is a limit to network traffic. On the other hand, in 3-DCG, all information including shapes, visual point information and light source information is processed in 3-dimensional data. Recent progress of computer graphics (referred to as "CG", hereinafter) technology has brought about rapid improvement of quality of images produced by CG. Therefore, also from a standpoint of data quantity, it is quite efficient to transfer CG data itself.

Usually, even if a quantity of CG data is not more than $\frac{1}{100}$ of that of conventional image data, the CG data is capable of displaying images having a quality equivalent to that of the conventional image data. In other words, the CG data has a compression ratio which is not less than 100 times that of the conventional image data. Hence, in transmission of image data through a network, an attempt is being made to use CG data, especially, 3-DCG data as standard. As one example of this attempt, the above mentioned VRML is proposed (VRML Ver2.0). The VRML Ver2.0 stipulates data format of shape data called "primitive", light source data, visual point data, texture data, etc. and how to specify displacement of a rigid body. Such a data format is referred to as a "VR format" (VRF) for the sake of convenience.

On the other hand, in conventional CG, attention is recently given to animation technology for forming images on real-time basis. By using this real-time animation technology, real motions of a CG character are reproduced mainly in commercial messages and movies. As an example, a complicated shape such as a human being is expressed by a skeletal structure and sophisticated motions of the skeletal structure can be reproduced naturally by defining motion amounts of joints of the skeleton, which change momentarily.

In conventional 3-DCG modeling languages on the Internet, mainly, the VRML, it has been impossible to impart motions on real-time basis to the shape having the complicated structure such as the human being. Meanwhile, it has also been impossible to formulate a system in which a plurality of users have virtual 3-dimensional space in common in virtual space involving a network such that their avatars are operated interactively in the common virtual 3-dimensional space. Furthermore, it has been impossible to transmit and receive voices or music on real-time basis synchronously with motions of the avatars in the common virtual 3-dimensional space.

SUMMARY OF THE INVENTION

Accordingly, an essential object of the present invention is to provide an apparatus for and a method of transmitting and receiving data streams representing 3-dimensional virtual space, in which motions can be imparted on real-time basis to a shape having a complicated structure such as a human being, a plurality of users have virtual 3-dimensional space in common in virtual space involving a network such that their avatars can be operated interactively in the common virtual 3-dimensional space and voices or music can be transmitted and received on real-time basis synchronously with motions of the avatars in the common virtual 3-dimensional space.

In order to accomplish this object of the present invention, an apparatus for transmitting and receiving data streams representing 3-dimensional virtual space, according to the present invention comprises: a transmitting member; a receiving member; and a transfer means for connecting the transmitting member and the receiving member in bidirectional manner; wherein a shape data stream, a motion data stream and an audio data stream representing a shape and a motion of a skeletal structure in 3-DCG and a sound synchronous with the motion, respectively are transmitted to the receiving member from the transmitting member such that the receiving member generates the 3-DCG through synchronization of the motion data stream and the audio data stream; the transmitting member comprising: a transmitting means for simultaneously transmitting, on real-time basis in response to a request from the receiving member, the shape data stream, the motion data stream and the audio data stream synchronous with the motion data stream as a plurality of streams in accordance with a format of a predetermined data stream such that the transfer means interactively transfers the streams from the transmitting member to the receiving member; the receiving member comprising: a data stream receiving means which receives the streams transmitted from the transmitting member via the transfer means so as to discriminate kinds and formats of the received streams and receives the streams as necessary on real-time basis so as to subject the discriminated streams to restoration processings required for the streams, respectively; a 3-dimensional virtual space generating means which generates the shape of the skeletal structure in the 3-dimensional virtual space or the 3-dimensional virtual space by using a shape stream of the streams received by the receiving member or 3-dimensional shape data read preliminarily and moves the shape of the skeletal structure by using a motion stream of the streams; and a sound generating means which reproduces, in case the streams contain an audio stream, the audio stream synchronously with the motion stream.

Meanwhile, a method of transmitting and receiving data streams representing 3-dimensional virtual space, in which a shape data stream, a motion data stream and an audio data stream representing a shape and a motion of a skeletal structure in 3-DCG and a sound synchronous with the motion, respectively are transmitted from a transmitting member to a receiving member such that the receiving member generates the 3-DCG through synchronization of the motion data stream and the audio data stream, according to the present invention comprises: a first step of simultaneously transmitting, on real-time basis in response to a request from the receiving member, the shape data stream, the motion data stream and the audio data stream synchronous with the motion data stream as a plurality of streams in accordance with a format of a predetermined data stream; a second step of connecting the transmitting member and the receiving member in bidirectional manner so as to transfer the streams from the transmitting member to the receiving member interactively; a third step of receiving the transferred streams so as to discriminate kinds and formats of the received streams and receiving the streams on real-time basis so as to subject the discriminated streams to restoration processings for the streams, respectively; a fourth step of generating the shape of the skeletal structure in the 3-dimensional virtual space or the 3-dimensional virtual space by using a shape stream of the streams received by the receiving member or 3-dimensional shape data read preliminarily and moving the shape of the skeletal structure by using a motion stream of the streams; and a fifth step of reproducing, in case the streams contain an audio stream, the audio stream synchronously with the motion stream.

By the above mentioned arrangement of the apparatus and the method of the present invention, the shape data of the skeletal structure such as a human being is transferred as the shape data stream, the fundamental motion of the skeleton is delivered as the motion data stream and the audio data accompanying the motion of the skeletal structure is transferred as the audio data stream together with information on synchronization and compression in each of the data streams and correspondence among the data streams.

Therefore, in accordance with the present invention, smooth motions of a character in a transmission and reception system based on a network and audio information synchronous with the motions can be transmitted and received interactively in response to a request of a user and quantity of the data to be transferred can be reduced greatly.

BRIEF DESCRIPTION OF THE DRAWINGS

This object and features of the present invention will become apparent from the following description taken in conjunction with the preferred embodiment thereof with reference to the accompanying drawings in which:

FIG. 6 is a mimetic diagram of packets of an animation stream acting as the 3-DCG data stream in the present invention;

FIG. 7 is a mimetic diagram of packets of a motion stream acting as the 3-DCG data stream in the present invention;

FIG. 11 is a mimetic diagram showing a format of a data stream representing motion relative to the skeletal structure (initial value) of FIG. 10;

Before the description of the present invention proceeds, it is to be noted that like parts are designated by like reference numerals throughout several views of the accompanying drawings.

DETAILED DESCRIPTION OF THE INVENTION

Figure 1:
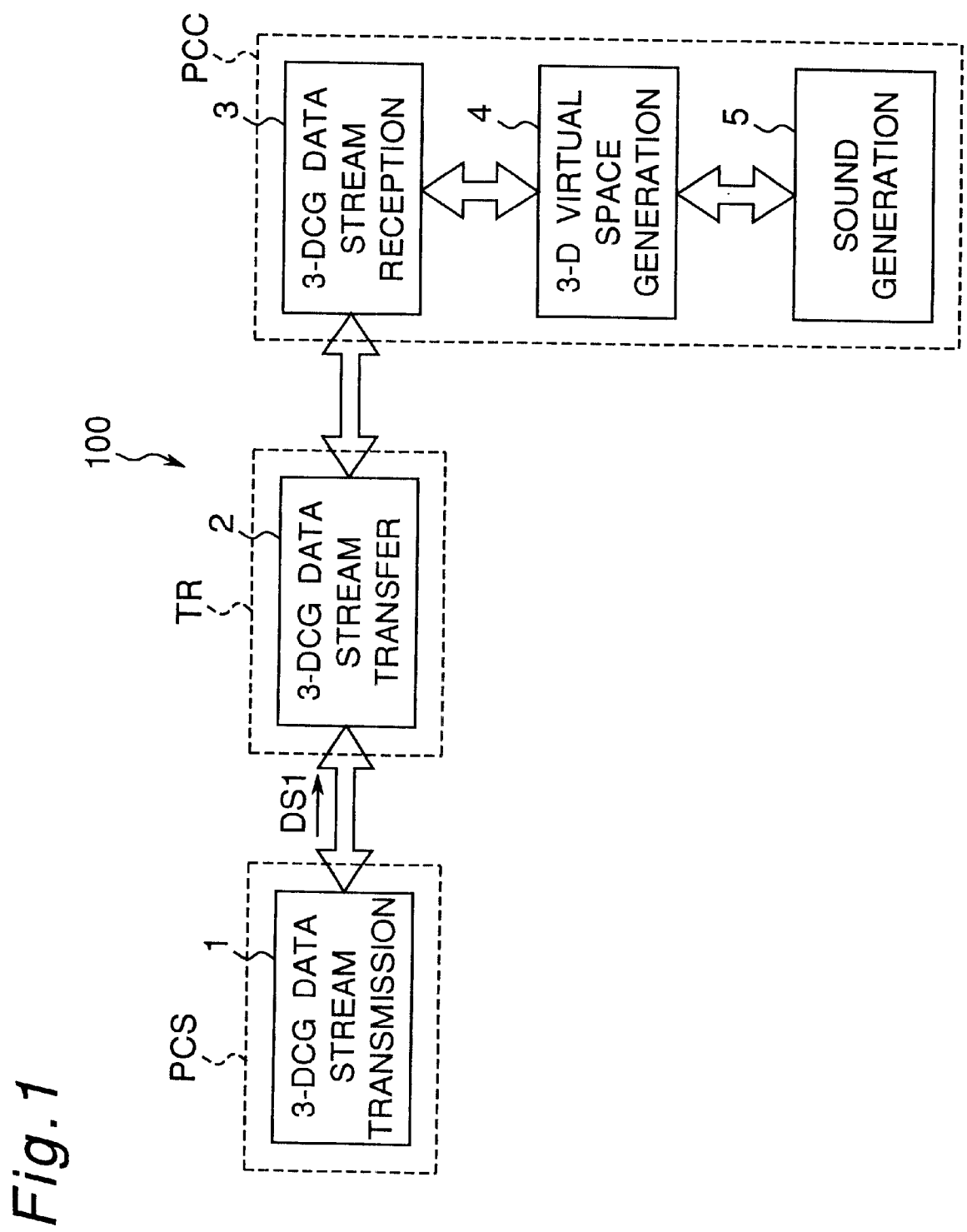
FIG. 1 is a block diagram showing a minimum configuration of an apparatus for transmitting and receiving data streams representing 3-dimensional virtual space, according to one embodiment of the present invention.

Hereinafter, one embodiment of the present invention is described with reference to the accompanying drawings. FIG. 1 shows a minimum configuration of an apparatus 100 for transmitting and receiving data streams representing 3-dimensional virtual space, according to one embodiment of the present invention. The apparatus 100 is constituted by a server PCS disposed at a transmitting side, a client PCC disposed at a receiving side and a transfer portion TR for connecting the server PCS and the client PCC. The server PCS generates 3-DCG data streams representing 3-dimensional virtual space, in accordance with a command inputted by the user with a stream authoring means provided usually externally. Operation of this stream authoring means will be described later.

The server PCS encodes (format conversion) a 3-DCG data stream DS for forming the 3-dimensional virtual space including an avatar of the user so as to generate an encoded data stream DS1. Meanwhile, a format VRF of the 3-DCG data stream DS and the encoded data stream DS1 will be described later with reference to FIGS. 4, 5 and 11. The transfer portion TR which connects the server PCS and the client PCC in bidirectional manner not only transfers the encoded data stream DS1 from the server PCS to the client PCC but transfers to the server PCS modified data on 3-DCG data inputted from the client PCC. Namely, the server PCS decodes (format conversion) the 3-DCG data stream DS by reconverting format of the inputted encoded data stream DS1 and reproduces a 3-DCG image representing the 3-dimensional virtual space. Meanwhile, in case the user has caused a change in the 3-dimensional virtual space by operating his own avatar at the server PCS, the server PCS generates image modificatory data DM representing the change and transmits the image modificatory data DM to the client PCC via the transfer portion TR.

Usually, the server PCS and the client PCC are mainly formulated by software in a computer such as a workstation and a personal computer. The server PCS includes a 3-DCG data stream transmitting portion 1, while the transfer portion TR includes a 3-DCG data stream transferring portion 2. Meanwhile, the client PCC includes a 3-DCG data stream receiving portion 3, a 3-dimensional virtual space generating portion 4 and a sound generating portion 5. The 3-dimensional virtual space generating portion 4 is connected to the 3-DCG data stream receiving portion 3 by a data bus so as to receive an input of the 3-DCG data stream DS from the 3-DCG data stream receiving portion 3. The 3-dimensional virtual space generating portion 4 not only generates 3-DCG on the basis of the 3-DCG data stream DS but generates an audio data stream Sa. The sound generating portion 5 is connected to the 3-dimensional virtual space generating portion 4 by a signal line and reproduces sound in response to input of the audio data stream Sa from the 3-dimensional virtual space generating portion 4.

Namely, the apparatus 100 simultaneously transmits from the 3-dimensional data stream transmitting portion 1 a plurality of 3-DCG data streams constituting the encoded data stream DS1. On the basis of the 3-DCG data streams received via the transfer portion TR, the client PCC generates a 3-dimensional animation including sound.

Figure 8:
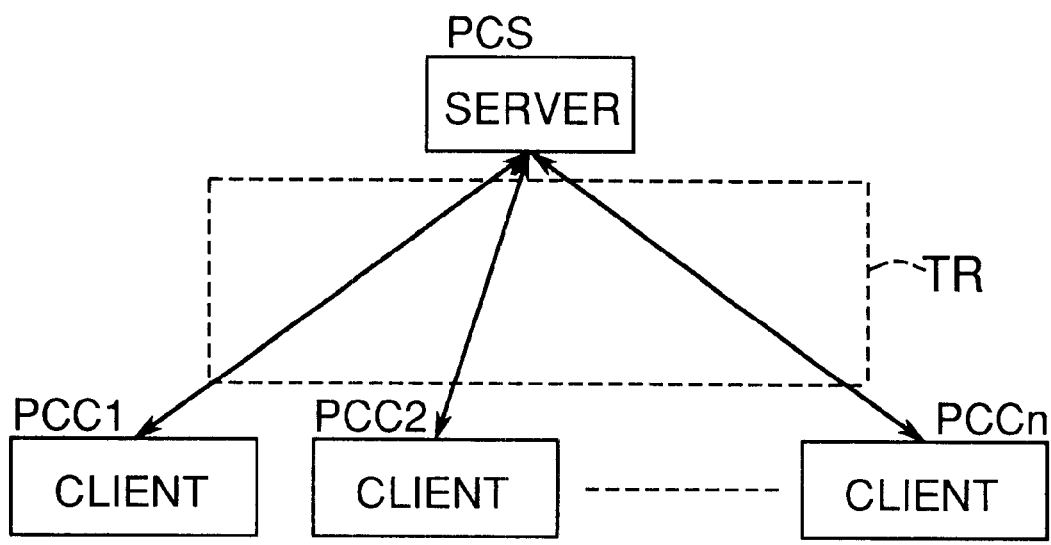
FIG. 8 is a mimetic diagram showing the apparatus of FIG. 1, in which a plurality of clients are connected to a single server.

In this example, the minimum configuration of the apparatus 100, in which the single client PCC is connected to the single server PCS through the transfer portion TR, is described. However, it is needless to say that a plurality of the clients PCCn (n=natural number) may be connected to the server PCS by way of the transfer portion TR as shown in FIG. 8.

Figure 2:
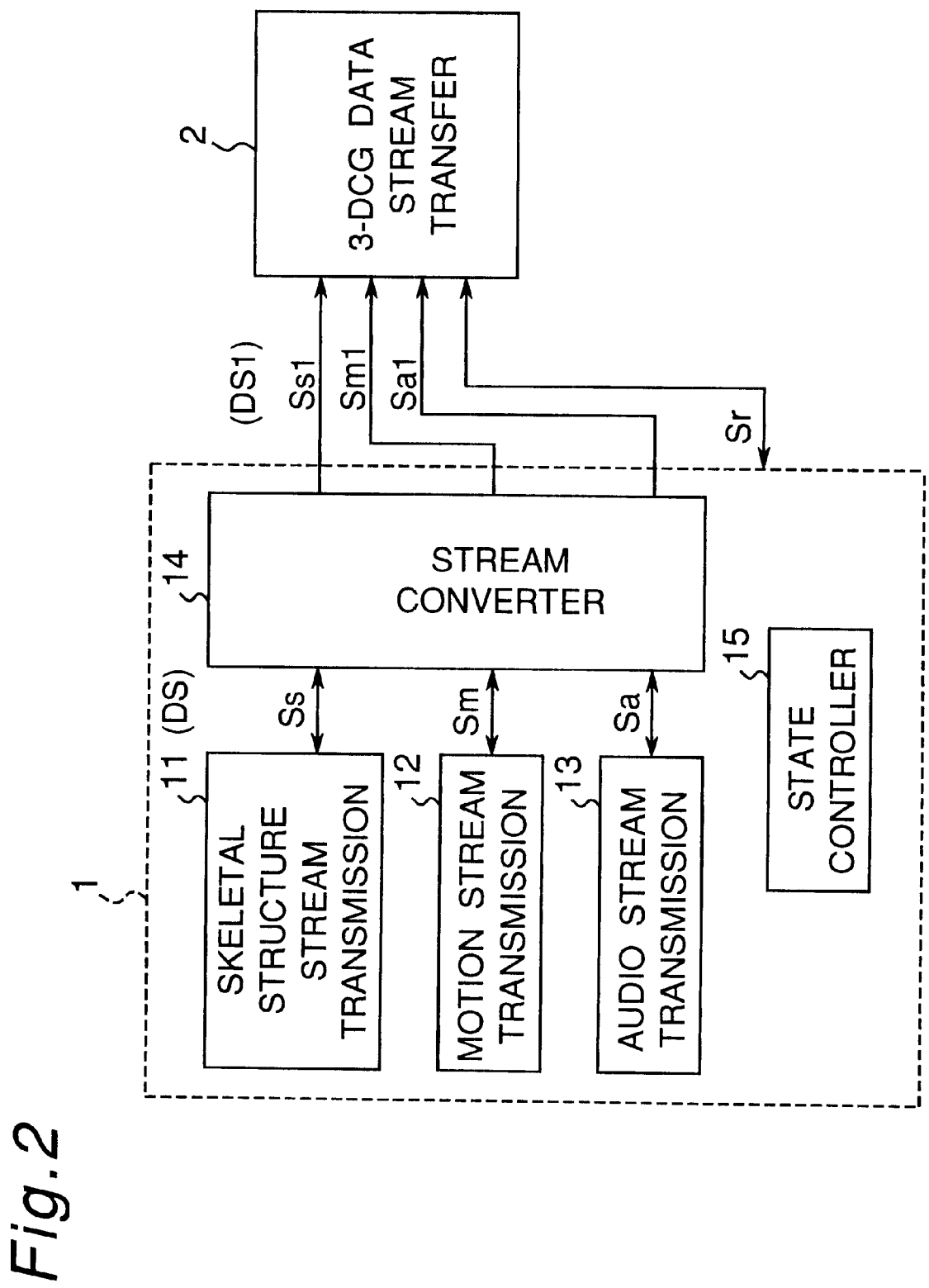
FIG. 2 is a block diagram of a 3-DCG data stream transmitting portion employed in the apparatus of FIG. 1.

FIG. 2 shows an example of a configuration of the 3-DCG data stream transmitting portion 1 in the server PCS. The 3-DCG data stream transmitting portion 1 is connected to the 3-dimesional CG data stream transferring portion 2 by a bidirectional signal line so as to exchange request signals Sr generated by the client PCC and the server PCS. The 3-DCG data stream transmitting portion 1 includes a skeletal structure stream transmitting portion 11 for generating a skeletal data stream Ss of the avatar, a motion stream transmitting portion 12 for generating a motion data stream Sm of the avatar, an audio stream transmitting portion 13 for generating the audio data stream Sa of the avatar, a stream converter 14 for performing encoding for converting the skeletal data stream Ss, the motion data stream Sm and the audio data stream Sa of the avatar into a predetermined format and a state controller 15 for controlling states such as an identity (ID) of the client and a state of the avatar in the apparatus 100.

The stream converter 14 is connected to the skeletal structure stream transmitting portion 11 and the 3-DCG data stream transferring portion 2 in bidirectional manner and encodes the skeletal data stream Ss of the avatar into a skeletal data stream Ss1 so as to supply the skeletal data stream Ss1 to the 3-DCG data stream transferring portion 2. Similarly, the stream converter 14 is connected to the motion stream transmitting portion 12 and the 3-DCG data stream transferring portion 2 in bidirectional manner and encodes the motion data stream Sm of the avatar into a motion data stream Sm1 so as to supply the motion data stream Sm1 to the 3-dimensional data stream transferring portion 2. Furthermore, the stream converter 14 is connected to the audio stream transmitting portion 13 and the 3-DCG data stream transferring portion 2 in bidirectional manner and encodes the audio data stream Sa into an audio data stream Sa1 so as to supply the audio data stream Sa1 to the 3-DCG data stream transferring portion 2.

In response to the request signal Sr transmitted from the client PCC, the 3-DCG data stream transmitting portion 1 causes the skeletal structure stream transmitting portion 11, the motion stream transmitting portion 12 and the audio stream transmitting portion 13 to generate and output the skeletal data stream Ss, the motion data stream Sm and the audio data stream Sa to the stream converter 14, respectively. The skeletal data stream Ss includes hierarchical data for defining hierarchical relation of a skeletal structure and information representing an initial state of the hierarchical data, states of joints of a skeleton, a shape corresponding to the skeleton and relation corresponding to the skeletal structure. The motion data stream Sm includes information on fundamental motions of the skeletal structure. The audio data stream Sa includes information representing a sound synchronous with motion information expressed by the motion data stream Sm.

The stream converter 14 imparts specific identification information to the data streams Ss, Sm and Sa, respectively so as to generate the skeletal data stream Ss1, the motion data stream Sm1 and the audio data stream Sa1 of a different format and outputs the data streams Ss1, Sm1 and Sa1 to the 3-DCG data stream transferring portion 2. As described earlier, a format of the Virtual Reality Modeling Language (VRML) or an extended one of the format of the VRML may be preferably used as the format of the data streams Ss1, Sm1 and Sa1. The format of the VRML is standardized in the VRML Ver. 2.0. Meanwhile, CG shape data which need not be transmitted by a stream may be transferred beforehand by way of a network by using the ordinary Hyper Text Markup Language (HTTP) or may be read from files on a local machine.

Figure 3:
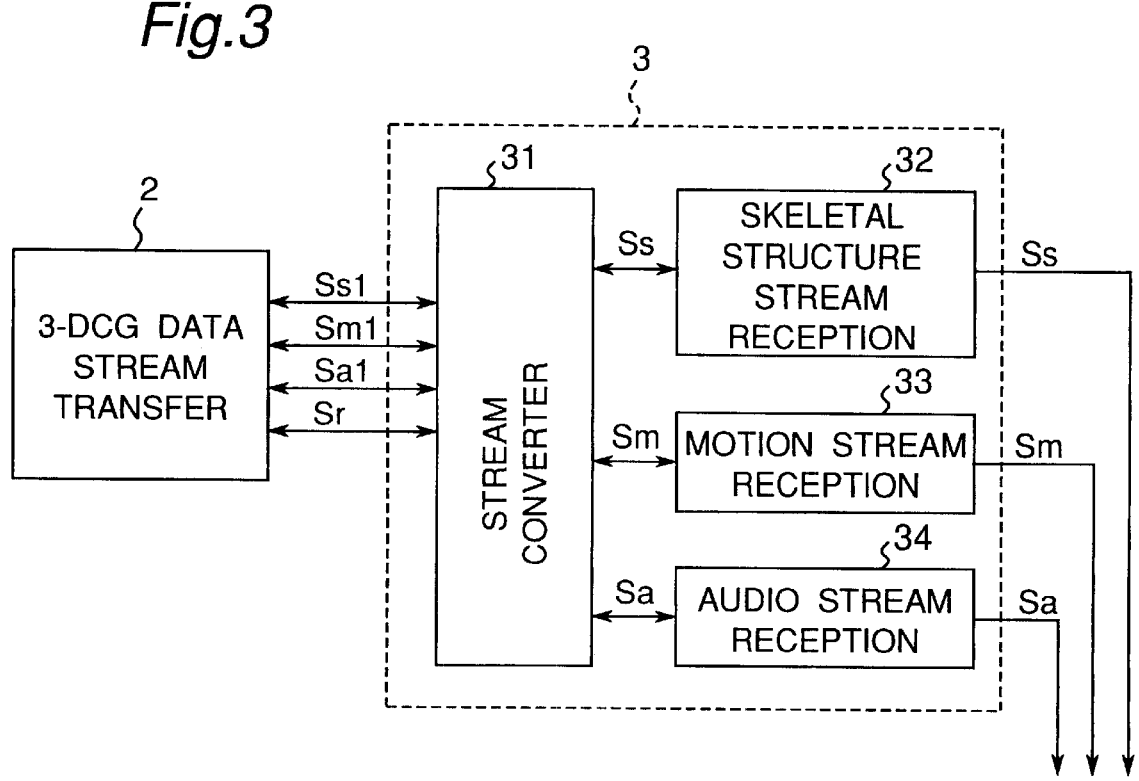
FIG. 3 is a block diagram of a 3-DCG data stream receiving portion employed in the apparatus of FIG. 1.

FIG. 3 shows a detailed construction of the 3-dimensionl CG data stream receiving portion 3. In the same manner as the 3-DCG data stream transmitting portion 1, the 3-DCG data stream receiving portion 3 is connected to the 3-DCG data stream transferring portion 2 in bidirectional manner so as to exchange the request signals Sr of the client PCC and the server PCS. The 3-DCG data stream receiving portion 3 includes a stream converter 31, a skeletal structure stream receiving portion 32, a motion stream receiving portion 33 and an audio stream receiving portion 34.

The stream converter 31 is connected to the 3-directional CG data stream transferring portion 2 and the skeletal structure stream receiving portion 32 in bidirectional manner. The stream converter 31 reconverts a format of the skeletal data stream Ss1 inputted from the 3-DCG data stream transmitting portion 1 through the 3-DCG data stream transferring portion 2 so as to decode the skeletal data stream Ss1 into the original skeletal data stream Ss and supplies the skeletal data stream Ss to the skeletal structure stream receiving portion 32. Likewise, the stream converter 31 is connected to the 3-DCG data stream transferring portion 2 and the motion stream receiving portion 33 in bidirectional manner and decodes the motion data stream Sm1 into the motion data stream Sm so as to supply the motion data stream Sm to the motion stream receiving portion 33. In addition, the stream converter 31 is connected to the 3-DCG data stream transferring portion 2 and the audio stream receiving portion 34 and decodes the audio data stream Sa1 into the audio data stream Sa so as to supply the audio data stream Sa to the audio stream receiving portion 34.

Namely, the skeletal data stream Ss1, the motion data stream Sm1 and the audio data stream Sa1 transmitted from the 3-DCG data stream transmitting portion 1 are inputted to the stream converter 31 by way of the 3-DCG data stream transferring portion 2. The stream converter 31 converts the inputted data streams Ss1, Sm1 and Sa1 into the original format reversely as necessary so as to decode the data streams Ss1, Sm1 and Sa1 into the skeletal data stream Ss, the motion data stream Sm and the audio data stream Sa, respectively and outputs the data streams Ss, Sm and Sa to the skeletal structure stream receiving portion 32, the motion stream receiving portion 33 and the audio stream receiving portion 34, respectively. As described above, the encoded 3-DCG data stream DS1 transferred from the 3-DCG data stream transferring portion 2 is decoded into the 3-DCG data stream DS by the stream converter 31 and the 3-DCG data stream DS is received as the skeletal data stream Ss, the motion data stream Sm and the audio data stream Sa by the skeletal structure stream receiving portion 32, the motion stream receiving portion 33 and the audio stream receiving portion 34, respectively.

Hereinafter, operation of the apparatus 100 is described briefly. In response to the request signals Sr from a plurality of the clients PCC, the 3-DCG data stream transmitting portion 1 of the server PCS transmits as the stream the hierarchical data for defining the hierarchical relation of the skeletal structure of the avatar and data on the initial state of the hierarchical data, restrictive conditions of the joints of the skeleton, shape corresponding to the skeleton and relation corresponding to the skeletal structure. The stream converter 14 performs format conversion and compression of the 3-DCG data stream DS so as to generate the encoded data stream DS1. If the 3-DCG data stream DS is of a composite type, the 3-DCG data stream DS is divided into the separate stream for motion or sound and the skeletal data stream Ss is compressed as necessary.

Meanwhile, the skeletal data of the avatar is described in detail in Japanese Patent Application No. 9-100453 filed on Apr. 17, 1997 by the assignee assigned by the present inventors. However, structure of the skeletal data of the avatar will be described briefly with reference to FIGS. 9 and 10 later.

First and second examples of the standard format VRF of the 3-DCG data stream DS of the present invention are described below with reference to FIGS. 4 and 5, respectively. In the first example of the format VRF in FIG. 4, each data stream, e.g., the skeletal data stream Ss is constituted by a main header MH, a sub-header SH and a data body DB. Kind of the data, sequence of the data, distinction between compression and noncompression, start time and stop time of the stream (or frame number), presence or absence of a loop, presence or absence of a time stamp used for synchronous reproduction, pitch at the time of reproduction, etc. are written in the main header MH. Size of the data, etc. are written in the sub-header SH which forms a pair with the data body DB. Unless otherwise specified in the following description, the skeletal data stream Ss, the motion data stream Sm and the audio data stream Sa are expressed in this format VRF.

Figure 5:
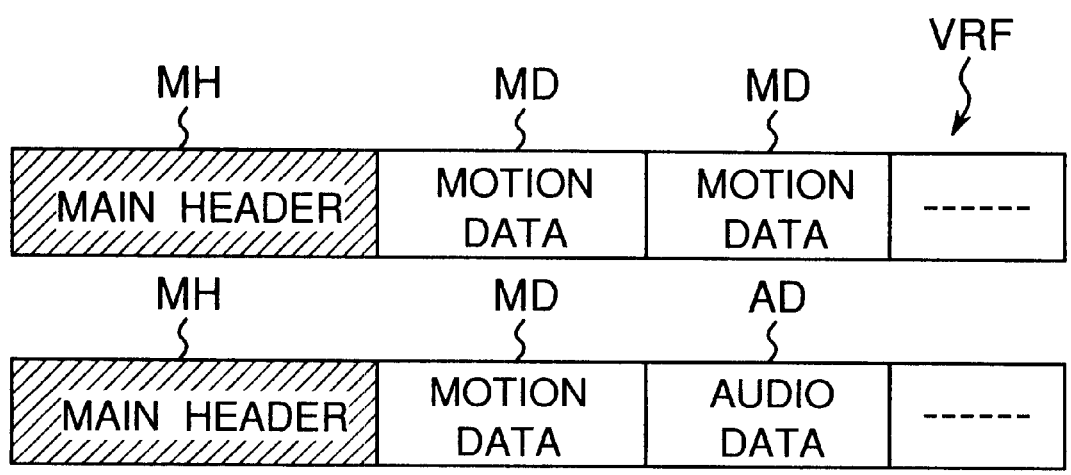
FIG. 5 is a view showing another example of the format of the 3-DCG data stream in the present invention.

In the second example of the format VRF in FIG. 5 directed to a composite type data stream, either motion data MD and audio data AD or motion data MD and motion data MD are arranged sequentially in one stream. In this case, the first and second data arranged sequentially should be usually synchronized with each other at the time of reproduction. The motion data MD or the audio data AD is properly divided into small units called "packets" each having a length necessary for synchronization and the packets are arranged. This sequence of the data is specified in the main header MH. As examples of the packets referred to above, FIG. 6 shows packets of an animation stream and FIG. 7 shows packets of a motion stream.

Figure 9:
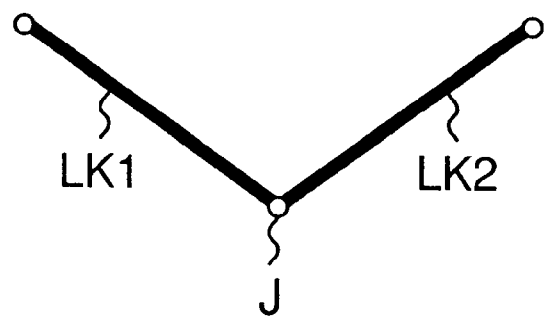
FIG. 9 is a view explanatory of a fundamental skeletal structure of the 3-DCG data stream in the present invention.

Hereinafter, data structure of the skeletal data stream Ss and the motion data stream Sm of the avatar is described with reference to FIGS. 9, 10 and 11. Initially, FIG. 9 shows a fundamental skeletal structure. For the sake of convenience, skeletal structure of the elbow of the avatar is described. Namely, two links LK1 and LK2 are connected to each other in hierarchical relation by a joint J. For example, assuming that the link LK1 is an upper arm and the link LK2 is a forearm, such a vertical hierarchical structure is formed in which the link LK1 is a parent and the link LK2 is a child.

Figure 10:
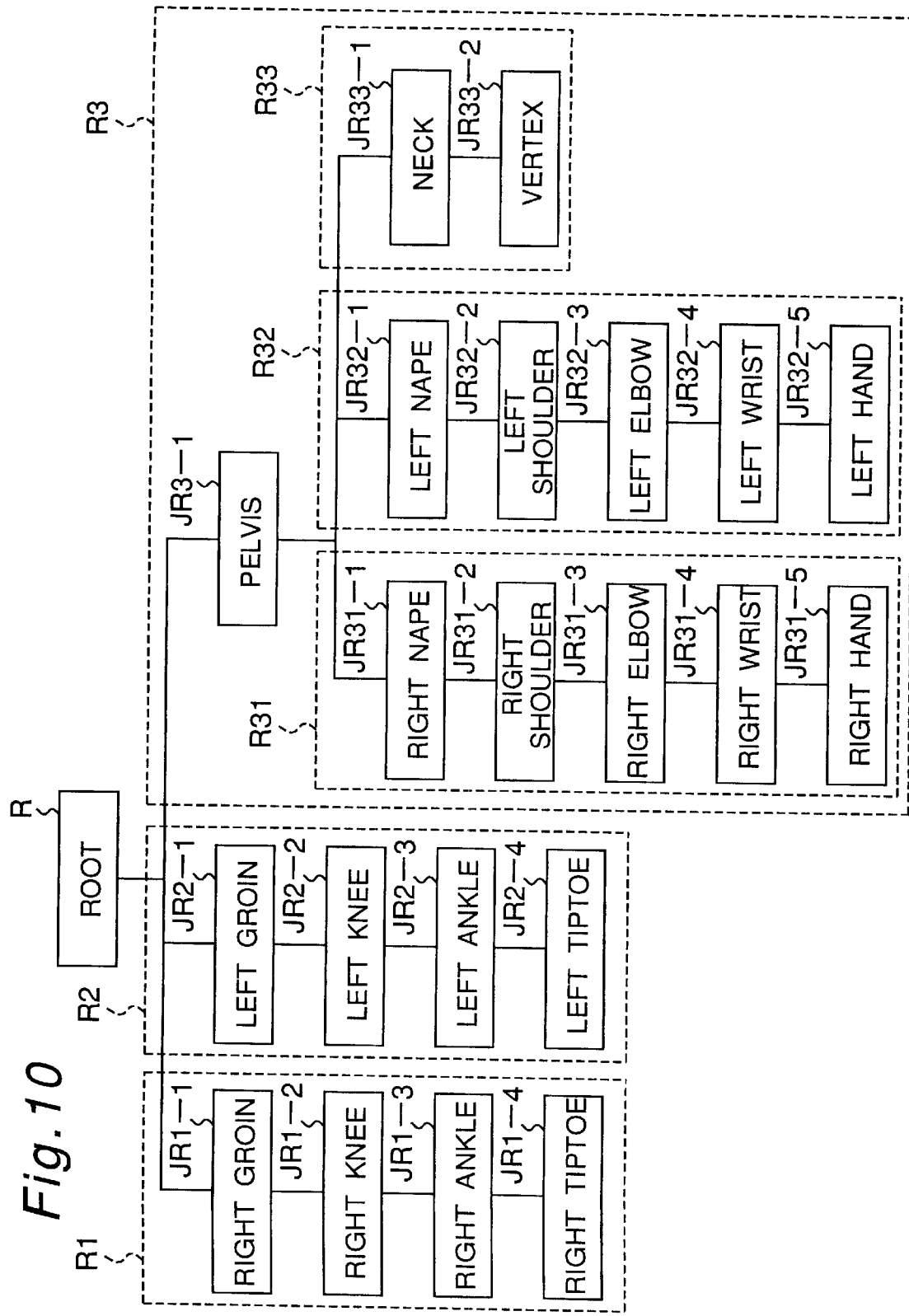
FIG. 10 is a mimetic diagram showing a general virtual data structure representing a skeletal structure of an avatar in the 3-DCG data stream in the present invention.

Then, FIG. 10 shows a general hierarchical structure of a whole of the avatar. In FIG. 10, each block shown by the solid lines corresponds to the joint J of FIG. 9 and each block shown by the broken line represents a boundary of each hierarchical system. Namely, in this example, three systems R1, R2 and R3 are led from a root R of a main body. In the primary system R1, the groin JR1-1 of the right leg, the right knee JR1-2, the right ankle JR1-3 and the right tiptoe JR1-4 proceed deeper hierarchically such that the right leg system R1 connected to the root R of the avatar is formed. Likewise, the left leg system R2 is formed by the groin JR2-1 of the left leg, the left knee JR2-2, the left ankle JR2-3 and the left tiptoe JR2-4. However, since the system R3 represents an upper half body, three secondary systems R31, R32 and R33 branch off from the pelvis JR3-1. The secondary system R31 forms a right arm system constituted by a hierarchy of the right nape JR31-1, the right shoulder JR31-2, the right elbow JR31-3, the right wrist JR31-4 and the right hand JR31-5. Similarly, the secondary system R32 forms a left arm system constituted by a hierarchy of the left nape JR32-1, the left shoulder JR32-2, the left elbow JR32-3, the left wrist JR32-4 and the left hand JR32-5. The secondary system R33 forms a head system constituted by a hierarchy of the neck JR33-1 and the vertex JR33-2.

Meanwhile, if the hierarchy of each system is deepened further and divided into more strata, it is possible to represent the avatar with a degree of freedom of motion more approximate to that of an actual human being. For example, if fingers are given to the right and left hands JR31-5 and JR32-5, 15 joints corresponding to joints of each hand may be provided.

FIG. 11 shows a format in which motion data corresponding to the above mentioned skeletal structure (initial value)

is listed in the motion data stream Sm. The fundamental motion data is time series data of rotational angle, in which angle for rotating each joint J about X-axis, Y-axis and Z-axis of a local coordinate system is expressed with the lapse of time. Moreover, the fundamental motion data is time series data including three elements of positional coordinates X, Y and Z of the root R and three elements of directional vectors of position of the root R in a global coordinate system. The data given in this way is repeated a plurality of times equal in number to frames necessary for time series and is recorded in the motion data stream Sm.

Processing in the client PCC is described by referring to FIG. 3 again. The skeletal structure stream receiving portion 32, the motion stream receiving portion 33 and the audio stream receiving portion 34 receive respectively the skeletal data stream Ss, the motion data stream Sm and the audio data stream Sa transferred from the 3-DCG data stream transferring portion 2. Usually in the computer PCC disposed at the receiving side, a necessary plural number of processes (or threads) for receiving the respective streams are generated simultaneously. These processes and the state controller 15 (FIG. 2) disposed at the transmitting side of the 3-DCG data stream transmitting portion 1 communicate with each other by the request signals Sr and monitor the number and state of the respective streams at any time.

Furthermore, in the skeletal structure stream receiving portion 32, the motion stream receiving portion 33 and the audio stream receiving portion 34, buffering of the streams is performed at any time in a common memory (or common buffer) through a plurality of the processes for receiving each stream. These buffered streams deliver the data streams Ss, Sm and Sa to the 3-dimensional virtual space generating portion 4 through synchronization in time among the streams. Meanwhile, the skeletal structure stream is reproduced on the basis of the CG shape data which was transferred preliminarily through a network by using the ordinary HTTP or was read from files on a local machine as described earlier. Moreover, the motion data stream Sm and the audio data stream Sa are delivered to the 3-dimensional virtual space generating portion 4 on real-time basis synchronously with the above mentioned skeletal structure stream.

In the 3-dimensional virtual space generating portion 4, 3-DCG generated in the 3-DCG data stream transmitting portion 1 of the server PCS on the basis of the stream inputted from the 3-DCG data stream receiving portion 3. Namely, the 3-dimensional virtual space generating portion 4 reproduces 3-dimensional virtual space by using a VRML browser for reproducing 3-dimensional virtual space or the like. In response to a trigger from the 3-dimensional virtual space generating portion 4, the data streams stored temporarily in the common buffers are sent simultaneously from the buffers to the processes of the stream receiving portions 32, 33 and 34 and then, to designated nodes of 3-dimensional virtual space defined by the VRML. In the nodes of the VRML, 3-dimensional shape, objects producing sounds and shape of skeletal joints are preliminarily designated.

Figures 12, 13:
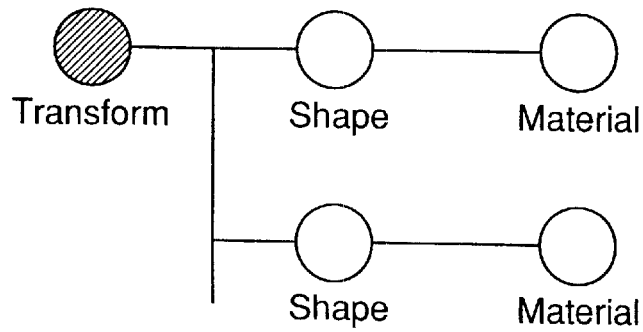
FIG. 12 is a view explanatory of a descriptive example based on the Virtual Reality Modeling Language (VRML) of a 3-dimensional scene in the present invention.
FIG. 13 is a mimetic diagram showing a scene structure corresponding to the descriptive example of FIG. 12.

FIGS. 12 and 13 show a 3-dimensional scene described by notation of the VRML Ver. 2.0. FIG. 12 shows a description of the VRML and FIG. 13 shows a scene structure corresponding to this description. In FIG. 13, circles are called "nodes" and the nodes recited as "Shape" correspond to objects present in 3-dimensional space. Meanwhile, the node recited as "Transform" correspond to translation, rotation, etc. Furthermore, hierarchical information on the 3-dimensional shape is expressed by nest relation separated by brackets. FIG. 12 shows an example in which when values of parameters following "Translation" and "Rotation" are changed, the two objects "Shape" are translated and rotated in accordance with the changed values of the parameters.

By changing value of "Rotation" of each joint of a specific 3-dimensional skeletal structure in time series, which is received by the motion stream receiving portion 33 of FIG. 3, position of each joint of the skeletal structure is changed in accordance with the above mentioned fundamental configuration. Namely, a human being or the like having the skeletal structure in the 3-dimensional virtual space is moved on real-time basis by data of the motion stream. Regarding the audio stream, an object node "Shape" corresponding to a sound source is set in the 3-dimensional scene expressed by a tree structure shown in FIG. 13. In response to a trigger of the user, the audio stream is delivered from the audio stream receiving portion 34 of FIG. 3 to the node "Shape" (FIGS. 12 and 13) corresponding to the sound source. A sensor node of the VRML is usually used as the trigger of the user. In the case of an ordinary personal computer, the received audio data is delivered to the sound generating portion 5 as it is so as to be reproduced. The sound generating portion 5 is constituted by a digital signal processor (DSP) for sound reproduction, a sound source, etc. Formats of "Wav", "Aiff", "MIDI", etc. are generally used for the audio data but PCM data may be used for voice or the like. Since internal time is usually governed in the 3-dimensional virtual space generating portion 4, the motion stream and the audio stream can be usually synchronized with each other by designating start time and stop time.

Figure 14:
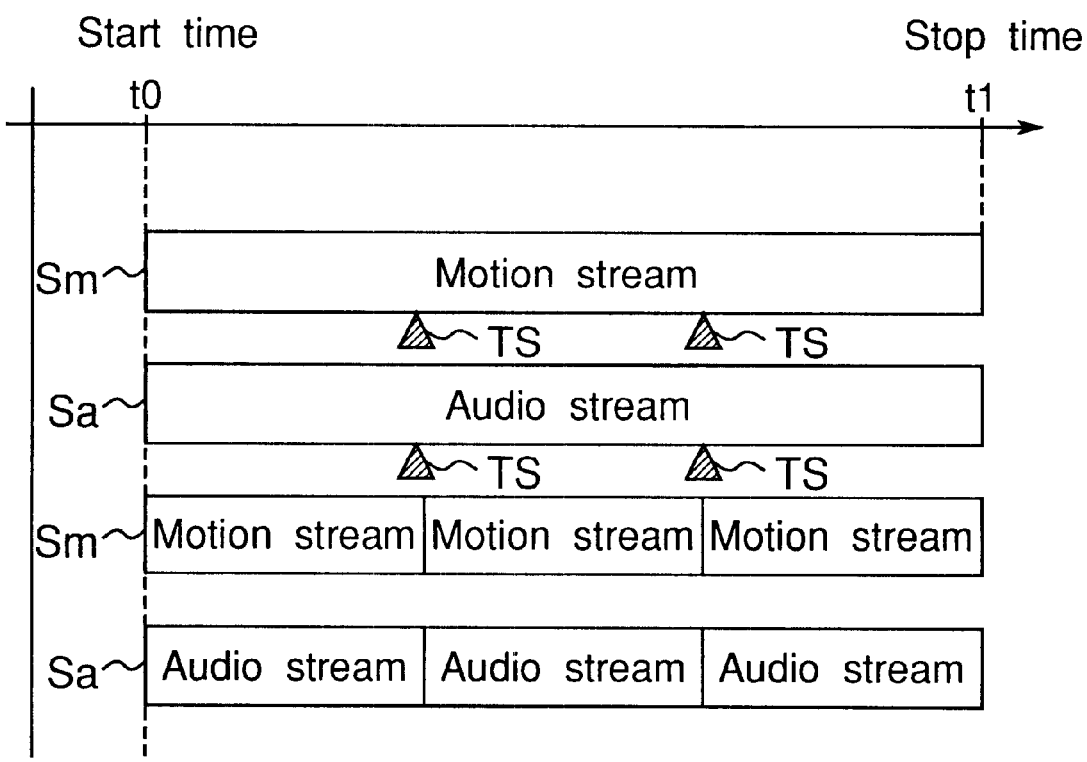
FIG. 14 is a view explanatory of one example of a synchronous method of the 3-DCG data stream in the present invention.

FIG. 14 shows reproduction of the CG stream in the 3-dimensional virtual space generating portion 4 in time series. As described above, the audio stream is generated by the sound generating portion 5 and is reproduced by setting a start time t0 and a stop time t1. The motion stream changes according to performance of the personal computer at the receiving side and complicacy of the 3-dimensional scene. Therefore, motion may lag behind or precede sound. In order to synchronize sound and motion by eliminating this, time stamps TS are preliminarily set in the motion data stream Sm and the audio data stream Sa which are separate from each other. If the time stamps TS are used, it becomes easy to synchronize reproduction of motion with reproduction of sound at positions of the time stamps TS of the audio data stream Sa. Namely, if it is found that reproduction of motion lags behind reproduction of sound at an arbitrary position of the corresponding time stamps TS, processing in which subsequent reproduction of motion up to the position of the corresponding time stamps TS is skipped is performed in the 3-dimensional virtual space generating portion 4. Meanwhile, if reproduction of motion has been finished at a position of corresponding time stamps TS, processing in which reproduction of motion is repeated until reproduction of sound is finished at the position of the corresponding time stamps TS is performed in the 3-dimensional virtual space generating portion 4.

Alternatively, if a composite type CG data stream is employed as shown at a lower portion of FIG. 14 and the data stream is divided into minimum packets for synchronization, sound and motion can be reproduced synchronously among the packets.

Fundamental operation of the stream authoring means referred to earlier with reference to FIG. 1 is described below briefly.

Figure 4:
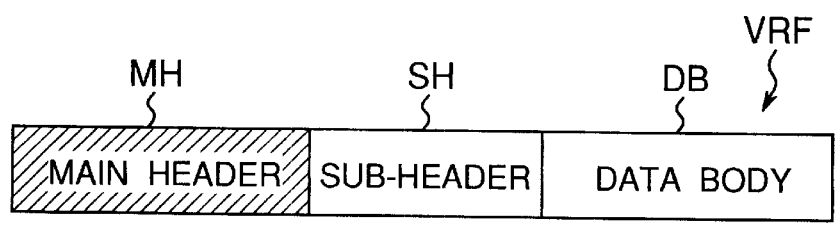
FIG. 4 is a view showing one example of a format of a 3-DCG data stream in the present invention.

The stream authoring means divides into data segments having arbitrary lengths necessary for synchronization the skeletal data stream Ss, the motion data stream Sm and the audio data stream Sa each having an arbitrary data length so as to convert the data streams Ss, Sm and Sa into the packets shown in FIGS. 4 and 5. Data length of the skeletal data stream Ss, data length of the motion data stream Sm and data length of the audio data stream S are arbitrarily determined by such conditions as the number of joints and degree of freedom, by duration of motion and by generation time of sound, respectively.

Furthermore, information on the time stamps TS required for synchronization is added to each stream as shown in FIG. 14. Furthermore, the streams may be connected to each other as necessary so as to form a new stream. The thus edited streams are registered in the server PCS.

Figure 15:
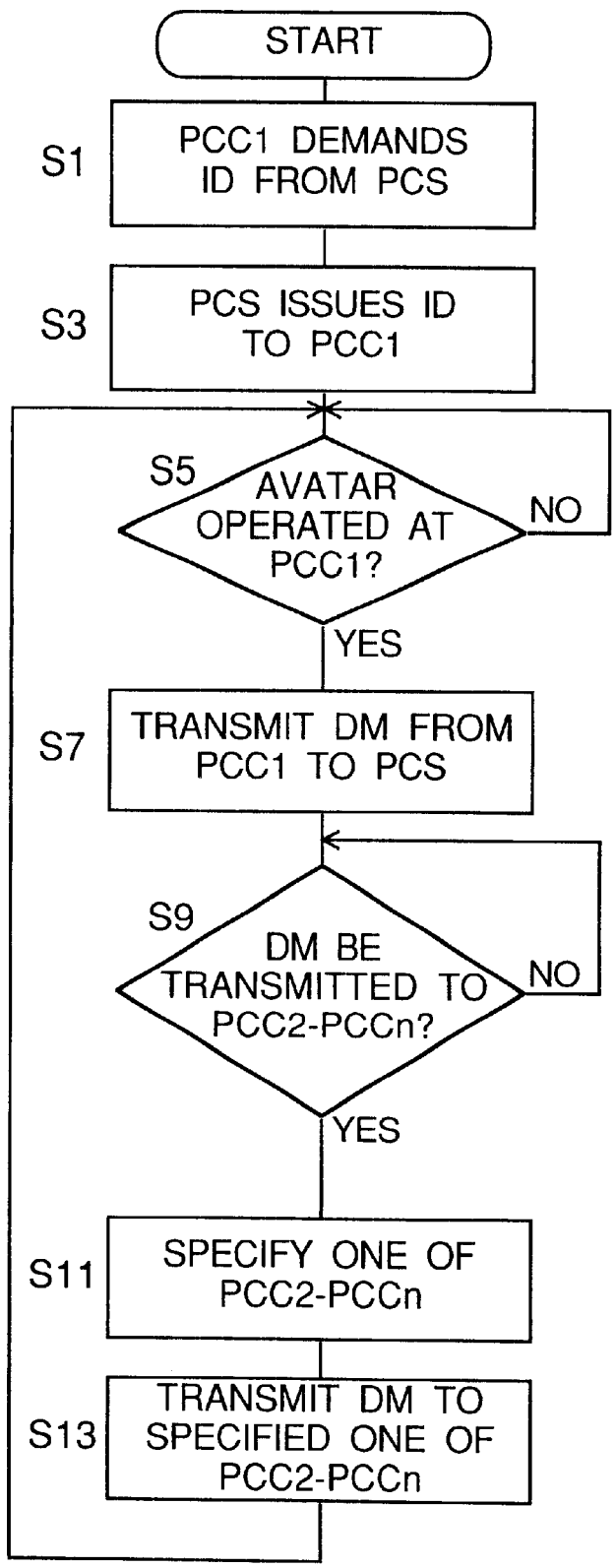
FIG. 15 is a flowchart showing sharing of 3-dimensional space in a multi-user network of FIG. 8.

Hereinafter, operation of the apparatus 100 of the present invention is described with reference to flowcharts of FIGS. 15, 16 and 17. FIG. 15 shows sharing of 3-dimensional space in a so-called multi-user network in which the server PCS and a plurality of the clients PCC are connected to each other as shown in FIG. 8 in the apparatus 100. In FIG. 8, a case is described below in which the client PCC1 is newly connected to the server PCS when a plurality of the clients PCC2 to PCCn are connected to the single server PCS and 3-dimensional space is shared by the server PCS and the clients PCC2 to PCCn. At step S1, the client PCC1 demands an ID from the server PCS. At step S3, the server PCS issues the ID to the client PCC1. At this time, an avatar of the client PCC1 appears in 3-dimensional virtual space of the client PCC1 and the server PCS. At step S5, it is judged whether or not the user has operated the avatar at the client PCC1. In the case of "YES" at step S5, the program flow proceeds to step S7. Otherwise, the decision at step S5 is made repeatedly. At step S7, the image modificatory data DM of the motion data stream Sm including information on motion of the avatar, which is based on operation of the user, is generated by the 3-DCG data stream receiving portion 3 of the client PCC1 and is transmitted to the 3-DCG data stream transmitting portion 1 of the server PCS via the transfer portion TR. Meanwhile, the server PCS identifies the user, ie., the client PCC1 on the basis of the ID transmitted together with the image modificatory data DM.

At step S9, it is judged whether or not the image modificatory data DM and the ID transmitted from the client PCC1 to the server PCS should be delivered to any one of the clients PCC2 to PCCn. Meanwhile, this decision at step S9 is usually made based on the request signal Sr from the client PCC1 but may be beforehand given from the client PCC1 to the server PCS at step S1. At step S11, an inquiry on to which one of the clients PCC2 to PCCn connected currently to the server PCS the image modificatory data DM should be delivered is addressed to the client PCC1 and an answer to the inquiry is received from the client PCC1. However, it is needless to say that such information at step S11 may be preliminarily determined at both the client PCC and the server PCS. After information on motion of the avatar of the client PCC1 has been transmitted by the image modificatory data DM at step S13 to the client designated by the client PCC1 at step S11, the program flow returns to step S5 and processing from step S5 to step S13 is repeated until the client PCC1 leaves the network.

Figure 16:
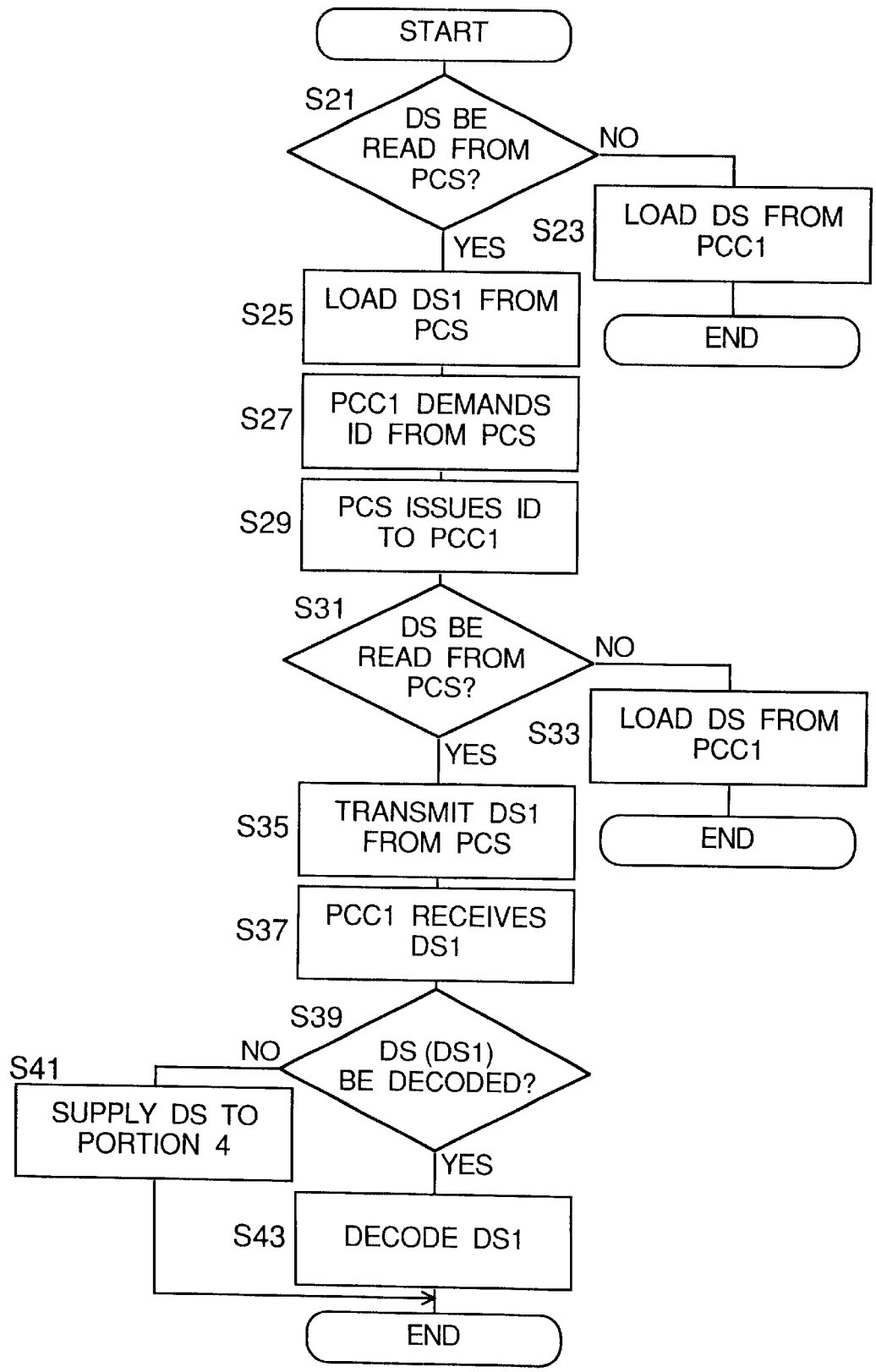
FIG. 16 is a flowchart showing transmission and reception of 3-dimensional virtual space in a single-user network of FIG. 1.

Then, by referring to FIG. 16, transmission and reception of 3-dimensional virtual space data in a so-called single-user network in which the single client PCC1 is connected to the server PCS as shown in FIG. 1 in the apparatus 100 are described. Initially, at step S21, an object from which the 3-DCG data stream DS representing 3-dimensional virtual space should be read is determined. For example, in case the 3-DCG data stream DS exists in the client PCC1, a decision of "NO" is made at step S21 and the program flow proceeds to step S23. At step S23, the 3-DCG data stream DS is read from a storage (not shown) of the client PCC1 and is supplied to the 3-dimensional virtual space generating portion 4 of the PCC1, in which a 3-dimensional virtual space image is generated. On the other hand, in the case of "YES" at step S21, the program flow proceeds to step S25. At step S25, the 3-DCG data stream DS1 is read from a storage (not shown) of the server PCS and is supplied to the 3-dimensional virtual space generating portion 4 of the PCC1, in which a 3-dimensional virtual space image is generated. The client PCC1 demands an ID from the server PCS at step S27 and the server PCS issues the ID to the client PCC1 at step S29.

At step S31, an object from which the client PCC1 reads the 3-DCG data stream DS of the avatar is determined. For example, in case the 3-DCG data stream DS of the avatar exists in the client PCC1, the request signal Sr from the client PCC1 does not demand that the 3-DCG data stream DS of the avatar should be read from the server PCS, so that a decision of "NO" is made at step S31 and thus, the program flow proceeds to step S33. At step S33, the 3-DCG data stream DS of the avatar is read from the storage of the client PCC1 and is supplied to the 3-dimensional virtual space generating portion 4 of the client PCC1. Then, an image of the avatar is generated in the 3-dimensional virtual space on the basis of the 3-DCG data stream DS of the avatar. On the contrary, in the case of "YES" at step S31, the program flow proceeds to step S35. At step S35, the skeletal data stream Ss and the motion data stream Sm of the avatar are transferred, on the basis of the request signal Sr from the client PCC1, to the client PCC1 by the PCS through their encoding (format conversion) as necessary. At step S37, the skeletal data stream Ss (Ss1) and the motion data stream Sm (Sm1) of the avatar transferred from the server PCS are received by the client PCC1.

At step S39, it is judged whether or not the skeletal data stream Ss (Ss1) and the motion data stream Sm (Sm1) received by the client PCC1 should be subjected to decoding (reverse format conversion). In the case of "NO" at step S39, the program flow proceeds to step S41. At step S41, the skeletal data stream Ss and the motion data stream Sm are supplied to the 3-dimensional virtual space generating portion 4 via the skeletal structure receiving portion 32 and the motion stream receiving portion 33 without being subjected to reverse format conversion by the stream converter 31. On the other hand, in the case of "YES" at step S39, the program flow proceeds to step S43. At step S43, the skeletal data stream Ss1 and the motion data stream Sm1 are subjected to decoding (reverse format conversion) into the skeletal data steam Ss and the motion data stream Sm by the stream converter 31 and then, the skeletal data stream Ss and the motion data stream Sm are, respectively, divided into their predetermined units by the skeletal structure stream receiving portion 32 and the motion stream receiving portion 33 so as to be supplied to the 3-dimensional virtual space generating portion 4. Thus, a 3-dimensional virtual space image reflecting motion changes of the avatar is generated in the 3-dimensional virtual space generating portion 4.

Then, synchronous processing of the 3-DCG data stream DS at the time of reproduction of 3-DCG by the 3-dimensional virtual space generating portion 4 of the client PCC is described with reference to FIG. 17. At step 51, an internal clock (Time Sensor) is reset by the 3-dimensional virtual space generating portion 4 in response to issuance of a command for starting drawing a 3-DCG scene. Namely, in response to a request from the server PCS, the respective clients PCC reset their internal clocks (Time Sensors) simultaneously. At step S53, it is judged whether or not the user has operated the avatar at the client PCC1. In the case of "YES" at step S53, the program flow proceeds to step S5. Otherwise, the decision at step S53 is made repeatedly. At step S55, the skeletal data stream Ss, the motion data stream Sm and the audio data stream Sa which are described in the VRML format are read from a primary memory (not shown) of the 3-dimensional virtual space generating portion 4. At step S57, it is judged based on description in the main header MH of each data stream whether or not synchronous reproduction is necessary. In the case of "NO" at step S57, the program flow proceeds to step S59. At a time specified in the VRML format by the internal clock (Time Sensor), not only the motion data stream Sm is reproduced but the audio data stream Sa is reproduced by the sound generating portion 5 at step S59. Namely, when an audio data format is sent together with a start signal from the 3-dimensional virtual space generating portion 4 to the sound generating portion 5, sound reproduction is started immediately by the sound generating portion 5.

On the contrary, in the case of "YES" at step S57, the program flow proceeds to step S61. At step S61, it is judged whether or not contents of the 3-DCG data stream DS are the audio data stream Sa. In the case of "YES" at step S61, the program flow proceeds to step S63. At step S63, information on the time stamps TS shown in FIG. 14 is fed back to the 3-dimensional virtual space generating portion 4 by the sound generating portion 5. On the other hand, in case the contents of the 3-DCG data stream DS are CG data, a decision of "NO" is made at step S61 and the program flow proceeds to step S65. At step S65, the information on the time stamps TS fed back from the sound generating portion 5 is inputted to the 3-dimensional virtual space generating portion 4 as a synchronous signal or in the case of sound packets, the end signal is inputted to the 3-dimensional virtual space generating portion 4 as a synchronous signal. At step S67, it is judged based on the above mentioned time stamps TS whether or not reading of CG data is completed. In the case of "YES" at step S67, the program flow proceeds to step S69. At step S69, reproduction of CG is suspended immediately and the program flow proceeds to step S71. Meanwhile, timing of reproduction of CG is governed by the internal clock (Time Sensor) of the VRML. At step S71, it is judged whether or not the 3-DCG data stream DS for further drawing and reproducing CG is inputted to the 3-dimensional virtual space generating portion 4 from the server PCS. In the case of "YES" at step S71, the program flow returns to step S51. Otherwise, a decision at step S71 is made repeatedly. On the other hand, in the case of "NO" at step S67, the program flow proceeds to step S73. At step S73, reproduction of CG is prolonged until a synchronization time indicated by the next time stamp TS and the program flow proceeds to step S71. Thus, the reproduction streams can be synchronized with each other.

Figure 17:
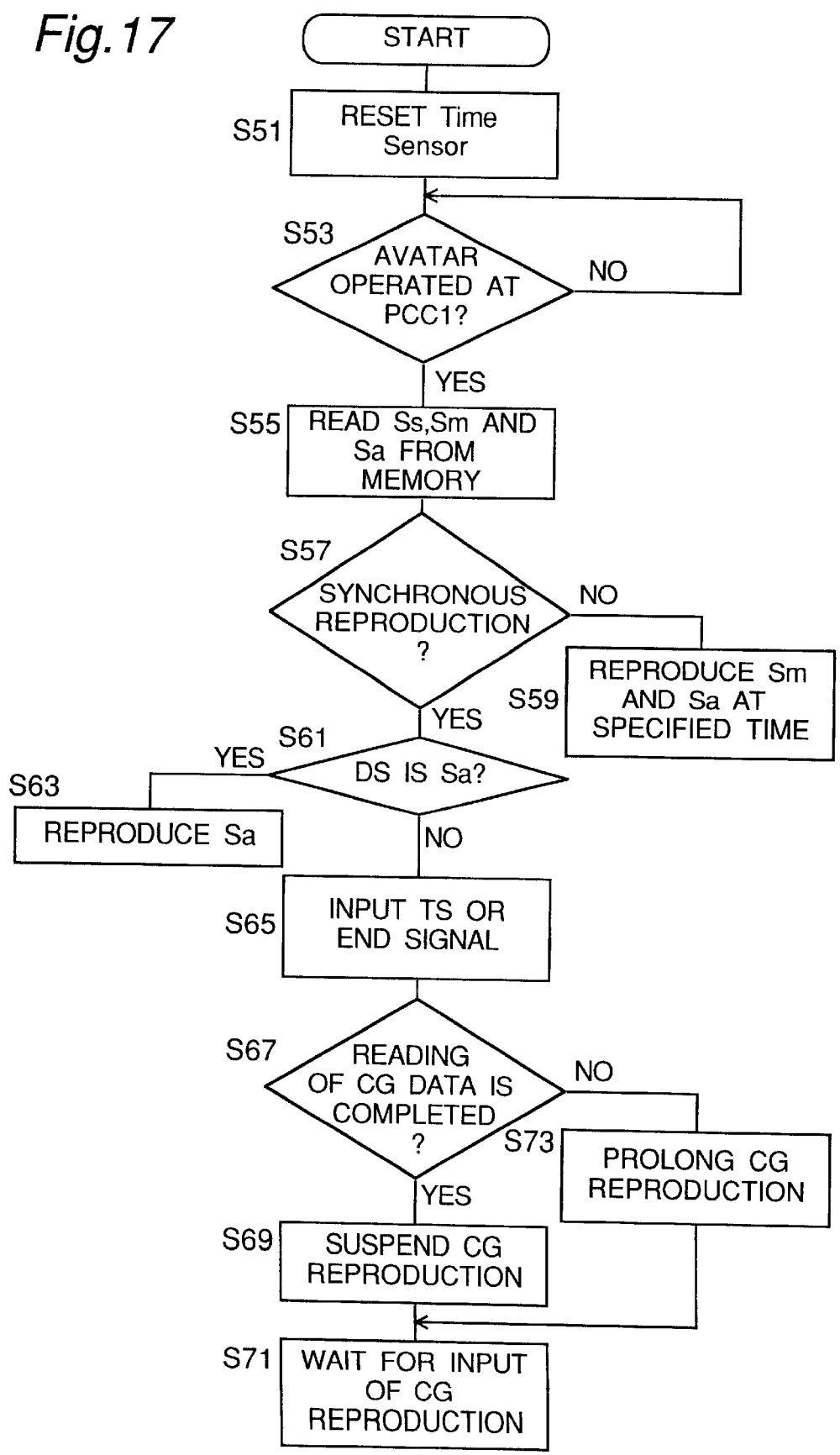
FIG. 17 is a flowchart showing synchronous processing of the 3-DCG data stream at the time of reproduction of 3-DCG in the present invention.
Figure 18:
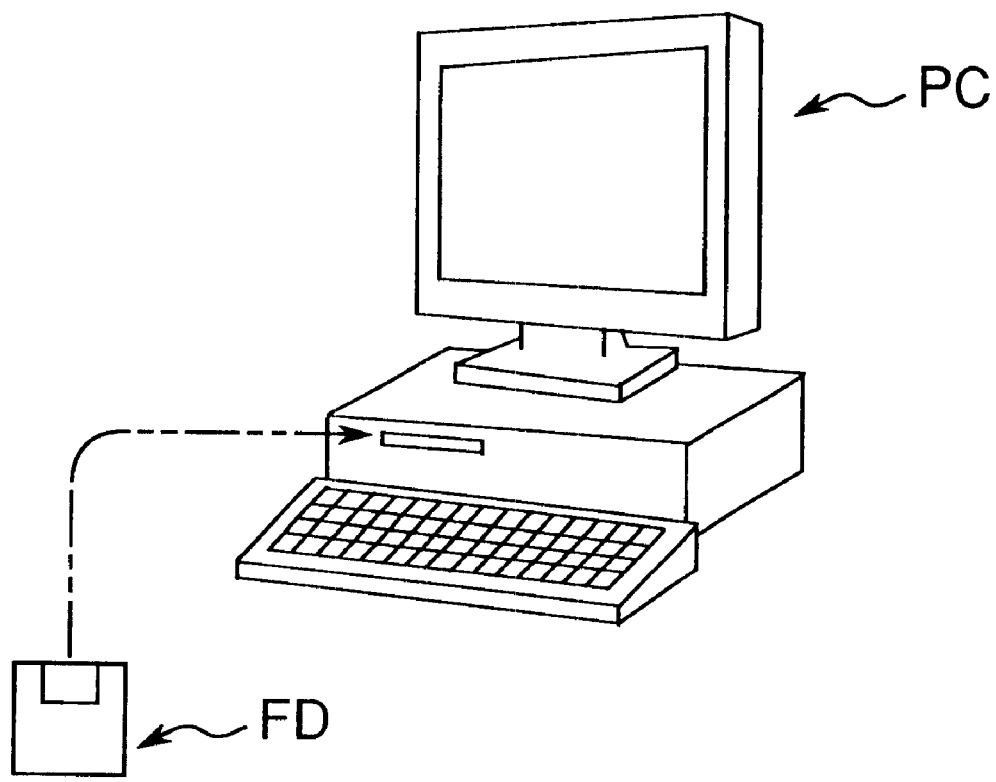
FIG. 18 is a perspective view of a personal computer for use with a floppy disk for recording programs for causing the personal computer to execute a method of the present invention having steps in the flowcharts of FIGS. 15 to 17.

A method of transmitting and receiving the data streams representing the 3-dimensional virtual space, according to the present invention has the above mentioned steps of the flowcharts of FIGS. 15 to 17 and programs for causing a computer to execute the method of the present invention may be recorded in a recording medium readable by the computer. To this end, a personal computer PC connectable with the Internet and a floppy disk FD readable by the personal computer PC, for example, may be, respectively, used as the computer and the recording medium as shown in FIG. 18.

Meanwhile, in the description given so far, the present invention is directed to a bidirectional communication system in the Internet but may be quite similarly applicable to a transmission system such as a satellite broadcasting system, a ground wave broadcasting system or the like when the transmission system is used together with the Internet.

As is clear from the foregoing description of the present invention, the shape data of the skeletal structure such as a human skeletal structure is transferred as the shape data stream, the fundamental motion of the skeleton is delivered as the motion data stream and the audio data accompanying the motion of the skeletal structure is transferred as the audio data stream together with information on synchronization and compression in each of the data streams and correspondence among the data streams.

Therefore, in accordance with the present invention, smooth motions of a character in the transmission and reception system based on the network and the audio information synchronous with the motions can be transmitted and received interactively in response to the user's request and quantity of the data to be transferred can be reduced greatly.

What is claimed is:

1. An apparatus for transmitting and receiving a plurality of data streams that include representation of 3-dimensional virtual space, the apparatus comprising:

a transmitting system;

a receiving system; and a transfer system that connects the transmitting system and the receiving system in a bidirectional manner;

the transmitting system comprising:

a data stream transmitting portion that simultaneously transmits, on a real-time basis in response to a request from the receiving system, the plurality of data streams, comprising a shape data stream representing a shape of a skeletal structure in 3-dimensional computer graphics (3-DCG), a motion data stream representing a motion of the skeletal structure in 3-DCG and an audio data stream representing a sound synchronous with the motion, in accordance with a predetermined format such that the transfer system interactively transfers the plurality of data streams from the transmitting system to the receiving system, the motion data stream comprising time series rotational angle data, time series positional data, and time series vector data; and the receiving system comprising:

a data stream receiver portion that receives and discriminates kinds and formats of the plurality of data streams transmitted from the transmitting system via the transfer system on a real-time basis to subject the discriminated streams to respective restoration processing;

a 3-dimensional virtual space generating portion that generates the shape of the skeletal structure in the 3-dimensional virtual space based on one of the shape data stream of the plurality of data streams received by the receiving system and preliminarily read 3-dimensional shape data, and moves the shape of the skeletal structure based on the motion data stream of the plurality of data streams; and a sound generating portion that reproduces the sound base on the audio data stream synchronously with the motion data stream.

2. The apparatus as claimed in claim 1, further comprising a reproducing system;

wherein the transmitting system further comprises a discriminating portion that produces discriminatory information for discriminating the shape data stream, the motion data stream and the audio data stream from each other in the plurality of data streams to be transmitted and compresses or divides the data streams, including the discriminatory information, into predetermined divisional units so as to transmit the data streams together with the discriminatory information;

wherein the data stream receiver portion comprises a receiver discriminating portion that discriminates the shape data stream, the motion data stream and the audio data stream from each other and a restoring portion that restores the original plurality of data streams by simultaneously coupling the divisional units with each other on the basis of the discriminatory information;

wherein the 3-dimensional virtual space generating portion discriminates the shape data stream, the motion data stream and the audio data stream from each other in the restored plurality of data streams;

wherein the reproducing system reproduces the shape data stream, the motion data stream and the audio data stream on the basis of the discriminatory information.

3. The apparatus as claimed in claim 1, further comprising a reproducing system;

wherein the transmitting system further comprises a discriminating portion that provides discriminatory information for discriminating the shape data stream, the motion data stream and the audio data stream from each other in the plurality of data streams to be transmitted and compresses or divides the plurality of data streams, including the discriminatory information together with kinds and combinations of the motions, a shape of a corresponding 3-dimensional skeletal structure and reproduction conditions into predetermined divisional units so as to transmit the plurality of data streams together with the discriminatory information;

wherein the data stream receiver portion comprises a receiver discriminating portion that discriminates the shape data stream, the motion data stream and the audio data stream from each other restores the original plurality of data streams for the plurality of motions, simultaneously coupling the divisional units with each other on the basis of the kinds and the combinations of the plurality of motions, the shape of the corresponding 3-dimensional skeletal structure and the reproduction conditions;

wherein the 3-dimensional virtual space generating portion discriminates the shape data stream, the motion data stream and the audio data stream from each other in the restored data stream; and wherein the reproducing system reproduces, for the plurality of motions, motions of the shape of the skeletal structure based on the kinds and the combinations of the motions, the shape of the corresponding 3-dimensional skeletal structure and the reproduction conditions.

4. The apparatus as claimed in claim 1, further comprising a reproducing system;

wherein the transmitting system further comprises a discriminating portion that provides discriminatory information for discriminating the shape data stream, the motion data stream and the audio data stream from each other in the plurality of data streams to be transmitted and compresses or divides the plurality of data streams, including the discriminatory information together with kinds and combinations of the motions and the sounds, a shape of a corresponding 3-dimensional skeletal structure and reproduction conditions into predetermined divisional units so as to transmit the plurality of data streams together with the discriminatory information and synchronous information of the motion data stream and the audio data stream;

wherein the data stream receiver portion comprises a receiver discriminating portion that discriminates the shape data stream, the motion data stream and the audio data stream from each other and a restoring portion that restores the original plurality of data streams for the plurality of motions and sounds, including simultaneously coupling the divisional units with each other on the basis of the kinds and combinations of the motions, the shape of the corresponding 3-dimensional skeletal structure and the reproduction conditions;

wherein the 3-dimensional virtual space generating portion discriminates the shape data stream, the motion data stream and the audio data stream from each other in the restored plurality of data streams; and wherein the reproducing system reproduces, for the plurality of motions and sounds, motions of the shape of the skeletal structure based on the kinds and the combinations of the motions, the shape of the corresponding 3-dimensional skeletal structure and the reproduction conditions simultaneously with reproducing the sound based on the audio data stream and the motion data stream synchronously with each other.

5. An apparatus for transmitting and receiving a plurality of data streams that include representation of 3-dimensional virtual space, the apparatus comprising:

a transmitting system;

a plurality of receiving systems;

a transmitting setting system; and a transfer system, wherein the transmitting system is connected to the plurality of receiving systems via the transfer system in a bidirectional manner; and the transmitting system comprising:

data stream transmitter portion that simultaneously transmits, on a real-time basis in response to a request from at least one of the plurality of receiving systems, the plurality of data streams, comprising a shape data stream representing a shape of a skeletal structure in 3-dimensional computer graphics (3-DCG), a motion data stream representing a motion of the skeletal structure in 3-DCG and an audio data stream representing a sound synchronous with the motion, in accordance with a predetermined format such that the transfer system interactively transfers the plurality of data streams from the transmitting system to the at least one of the plurality of receiving systems, the motion data stream comprising time series rotational angle data, time series positional data, and time series vector data; and the at least one of the plurality of receiving systems comprising:

a data stream receiver portion that receives and discriminates kinds and formats of the plurality of data streams transmitted from the transmitting system via the transfer system on a real-time basis;

a 3-dimensional virtual space generating portion that generates the shape of the skeletal structure in the 3-dimensional virtual space based on one of the shape data streams of the plurality of data streams received by the at least one of the plurality of receiving systems and preliminarily read 3-dimensional shape data, and moves the shape of the skeletal structure based on the motion data stream of the plurality of data streams; and a sound generating portion that reproduces the sound based on the audio data stream of the plurality of data streams synchronously with the motion data stream;

wherein the 3-dimensional virtual space generating portion designates, in response to the request from the at least one of the plurality of receiving systems, a kind and a section of data to be transmitted in the data stream restored by the data stream receiver portion to control the designated data; and wherein the transmitting setting system sets transmission of the controlled designated data to the at least one of the plurality of receiving systems such that the transmitting system transfers the controlled designated data to the at least one of the plurality of receiving systems in response to the request.

6. The apparatus as claimed in claim 5, further comprising a reproducing system;

wherein the transmitting system further comprises a discriminating portion that produces discriminatory information for discriminating the shape data stream, the motion data stream and the audio data stream from each other in the plurality of data streams to be transmitted and compresses or divides the data streams, including the discriminatory information, into predetermined divisional units so as to transmit the data streams together with the discriminatory information;

wherein the data stream receiver portion comprises a receiver discriminating portion that discriminates the shape data stream, the motion data stream and the audio data stream from each other and a restoring portion that restores the original plurality of data streams by simultaneously coupling the divisional units with each other on the basis of the discriminatory information;

wherein the 3-dimensional virtual space generating portion discriminates the shape data stream, the motion data stream and the audio data stream from each other in the restored plurality of data streams;

wherein the reproducing system reproduces the shape data stream, the motion data stream and the audio data stream on the basis of the discriminatory information.

7. The apparatus as claimed in claim 5, further comprising a reproducing system;

wherein the transmitting system further comprises a discriminating portion that provides discriminatory information for discriminating the shape data stream, the motion data stream and the audio data stream from each other in the plurality of data streams to be transmitted and compresses or divides the plurality of data streams, including the discriminatory information together with kinds and combinations of the motions, a shape of a corresponding 3-dimensional skeletal structure and reproduction conditions into predetermined divisional units so as to transmit the plurality of data streams together with the discriminatory information;

wherein the data stream receiver portion comprises a receiver discriminating portion that discriminates the shape data stream, the motion data stream and the audio data stream from each other restores the original plurality of data streams for the plurality of motions, simultaneously coupling the divisional units with each other on the basis of the kinds and the combinations of the plurality of motions, the shape of the corresponding 3-dimensional skeletal structure and the reproduction conditions;

wherein the 3-dimensional virtual space generating portion discriminates the shape data stream, the motion data stream and the audio data stream from each other in the restored data stream; and wherein the reproducing system reproduces, for the plurality of motions, motions of the shape of the skeletal structure based on the kinds and the combinations of the motions, the shape of the corresponding 3-dimensional skeletal structure and the reproduction conditions.

8. The apparatus as claimed in claim 5, further comprising a reproducing system;

wherein the transmitting system further comprises a discriminating portion that provides discriminatory information for discriminating the shape data stream, the motion data stream and the audio data stream from each other in the plurality of data streams to be transmitted and compresses or divides the plurality of data streams, including the discriminatory information together with kinds and combinations of the motions and the sounds, a shape of a corresponding 3-dimensional skeletal structure and reproduction conditions into predetermined divisional units so as to transmit the plurality of data streams together with the discriminatory information and synchronous information of the motion data stream and the audio data stream;

wherein the data stream receiver portion comprises a receiver discriminating portion that discriminates the shape data stream, the motion data stream and the audio data stream from each other and a restoring portion that restores the original plurality of data streams for the plurality of motions and sounds, including simultaneously coupling the divisional units with each other on the basis of the kinds and combinations of the motions, the shape of the corresponding 3-dimensional skeletal structure and the reproduction conditions;

wherein the 3-dimensional virtual space generating portion discriminates the shape data stream, the motion data stream and the audio data stream from each other in the restored plurality of data streams; and wherein the reproducing system reproduces, for the plurality of motions and sounds, motions of the shape of the skeletal structure based on the kinds and the combinations of the motions, the shape of the corresponding 3-dimensional skeletal structure and the reproduction conditions simultaneously with reproducing the sound based on the audio data stream and the motion data stream synchronously with each other.

9. A method of transmitting and receiving a plurality of data streams representing 3-dimensional virtual space, in which a shape data stream, a motion data stream and an audio data stream, respectively representing a shape and a motion of a skeletal structure in 3-dimensional computer graphics (3-DCG) and a sound synchronous with the motion, are transmitted from a transmitting system to a receiving system such that the receiving system generates the 3-DCG through synchronization of the motion data stream and the audio data stream, the method comprising:

simultaneously transmitting, on real-time basis in response to a request from the receiving system, the shape data stream, the motion data stream and the audio data stream synchronous with the motion data stream as the plurality of streams in accordance with a predetermined format, the motion data stream comprising time series rotational angle data, time series positional data, and time series vector data;

connecting the transmitting system and the receiving system in a bidirectional manner to transfer the plurality of streams from the transmitting system to the receiving system interactively;

receiving the plurality of streams on a real-time basis to discriminate kinds and formats of the received streams and to subject the discriminated streams to respective restoration processings;

generating the shape of the skeletal structure in the 3-dimensional virtual space based on one of the restored shape data stream and 3-dimensional shape data read preliminarily, and moving the shape of the skeletal structure based on the restored motion data stream of the plurality of streams; and reproducing the sound synchronously with the motion stream based on the restored audio data stream.

10. The method as claimed in claim 9, wherein the transmitting comprises producing data stream discriminatory information for discriminating the shape data stream, the motion data stream and the audio data stream from each other and compressing or dividing the data streams, including the discriminatory information, into predetermined divisional units so as to transmit the data streams together with the discriminatory information;

wherein the receiving comprises discriminating the shape data stream, the motion data stream and the audio data stream from each other and restoring the original plurality of data streams by simultaneously coupling the divisional units with each other on the basis of the discriminatory information;

wherein the generating comprises discriminating the shape data stream, the motion data stream and the audio data stream from each other in the restored plurality of data streams and reproducing the shape data stream, the motion data stream and the audio data stream on the basis of the discriminatory information.

11. The method as claimed in claim 9, wherein the transmitting comprises producing data stream discriminatory information for discriminating the shape data stream, the motion data stream and the audio data stream from each other and compressing or dividing the data streams, including the discriminatory information together with kinds and combinations of a plurality of motions, a shape of a corresponding 3-dimensional skeletal structure and reproduction conditions, into predetermined divisional units so as to transmit the data streams together with the discriminatory the discrimination information;

wherein the receiving comprises discriminating the shape data stream, the motion data stream and the audio data stream from each other and restoring the original plurality of data streams for the plurality of motions including simultaneously coupling the divisional units with each other on the basis of the kinds and the combinations of the plurality of motions, the shape of the corresponding 3-dimensional skeletal structure and the reproduction conditions;

wherein the generating comprises discriminating the shape data stream, the motion data stream and the audio data stream from each other in the restored plurality of data streams and reproducing, for the plurality of motions, motions of the shape of the skeletal structure based on the kinds and combinations of the plurality of motions, the shape of the corresponding 3-dimensional skeletal structure and the reproduction conditions.

12. The method as claimed in claim 9, wherein the transmitting comprises producing data stream discriminatory information for discriminating the shape data stream, the motion data stream and the audio data stream from each other and compressing or dividing the data streams, including the discriminatory information together with kinds and combinations of a plurality of motions and sounds, a shape of a corresponding 3-dimensional skeletal structure and reproduction conditions, into predetermined divisional units so as to transmit the data streams together with the discriminatory information and synchronous information of the motion data stream and the audio data stream;

wherein the receiving comprises discriminating the shape data stream, the motion data stream and the audio data stream from each other and restoring the original plurality of data streams for the plurality of motions and sounds, including simultaneously coupling the divisional units with each other on the basis of the kinds and the combinations of the plurality of motions, the shape of the corresponding 3-dimensional skeletal structure and the reproduction conditions;

wherein the generating comprises discriminating the shape data stream, the motion data stream and the audio data stream from each other in the restored plurality of data streams and reproducing, for the plurality of motions and sounds, motions of the shape of the skeletal structure designated based on the kinds and combinations of the plurality of motions, the shape of the corresponding 3-dimensional skeletal structure and the reproduction conditions and simultaneously reproducing the audio data stream and the motion data stream synchronously with each other.

13. A method of transmitting and receiving a plurality of data streams representing 3-dimensional virtual space, in which a shape data stream, a motion data stream and an audio data stream, respectively representing a shape and a motion of a skeletal structure in 3-dimensional computer graphics (3-DCG) and a sound synchronous with the motion, are transmitted from a transmitting system to a plurality of receiving systems such that the receiving systems generate the 3-DCG through synchronization of the motion data stream and the audio data stream, the method comprising:

simultaneously transmitting, on real-time basis in response to a request from at least one of the plurality of receiving systems, the shape data stream, the motion data stream and the audio data stream synchronous with the motion data stream as the plurality of streams in accordance with a predetermined format, the motion data stream comprising time series rotational angle data, time series positional data, and time series vector data;

connecting the transmitting system and the at least one receiving system in a bidirectional manner to transfer the plurality of streams from the transmitting system to the at least one receiving system interactively;

receiving the plurality of streams on a real-time basis to discriminate kinds and formats of the received streams and to subject the discriminated streams to respective restoration processings;

generating the shape of the skeletal structure in the 3-dimensional virtual space based on one of the restored shape data stream and 3-dimensional shape data read preliminarily, and moving the shape of the skeletal structure based on the restored motion data stream of the plurality of streams; and reproducing the sound synchronously with the motion data stream based on the restored audio data stream;

wherein the generating comprises designating, in response to a request from the at least one of the plurality of receiving systems, a kind and a section of data to be transmitted, controlling the designated data and setting transmission of the controlled designated data to the at least one receiving system such that the transmitting system transfers the controlled designated data to the at least one receiving system in response to the request.

14. The method as claimed in claim 13, wherein the transmitting comprises producing data stream discriminatory information for discriminating the shape data stream, the motion data stream and the audio data stream from each other and compressing or dividing the data streams, including the discriminatory information, into predetermined divisional units so as to transmit the data streams together with the discriminatory information;

wherein the receiving comprises discriminating the shape data stream, the motion data stream and the audio data stream from each other and restoring the original plurality of data streams by simultaneously coupling the divisional units with each other on the basis of the discriminatory information;

wherein the generating comprises discriminating the shape data stream, the motion data stream and the audio data stream from each other in the restored plurality of data streams and reproducing the shape data stream, the motion data stream and the audio data stream on the basis of the discriminatory information.

15. The method as claimed in claim 13, wherein the transmitting comprises producing data stream discriminatory information for discriminating the shape data stream, the motion data stream and the audio data stream from each other and compressing or dividing the data streams, including the discriminatory information together with kinds and combinations of a plurality of motions, a shape of a corresponding 3-dimensional skeletal structure and reproduction conditions, into predetermined divisional units so as to transmit the data streams together with the discriminatory the discrimination information;

wherein the receiving comprises discriminating the shape data stream, the motion data stream and the audio data stream from each other and restoring the original plurality of data streams for the plurality of motions including simultaneously coupling the divisional units with each other on the basis of the kinds and the combinations of the plurality of motions, the shape of the corresponding 3-dimensional skeletal structure and the reproduction conditions;

wherein the generating comprises discriminating the shape data stream, the motion data stream and the audio data stream from each other in the restored plurality of data streams and reproducing, for the plurality of motions, motions of the shape of the skeletal structure based on the kinds and combinations of the plurality of motions, the shape of the corresponding 3-dimensional skeletal structure and the reproduction conditions.

16. The method as claimed in claim 13, wherein the transmitting comprises producing data stream discriminatory information for discriminating the shape data stream, the motion data stream and the audio data stream from each other and compressing or dividing the data streams, including the discriminatory information together with kinds and combinations of a plurality of motions and sounds, a shape of a corresponding 3-dimensional skeletal structure and reproduction conditions, into predetermined divisional units so as to transmit the data streams together with the discriminatory information and synchronous information of the motion data stream and the audio data stream;

wherein the receiving comprises discriminating the shape data stream, the motion data stream and the audio data stream from each other and restoring the original plurality of data streams for the plurality of motions and sounds, including simultaneously coupling the divisional units with each other on the basis of the kinds and the combinations of the plurality of motions, the shape of the corresponding 3-dimensional skeletal structure and the reproduction conditions;

wherein the generating comprises discriminating the shape data stream, the motion data stream and the audio data stream from each other in the restored plurality of data streams and reproducing, for the plurality of motions and sounds, motions of the shape of the skeletal structure designated based on the kinds and combinations of the plurality of motions, the shape of the corresponding 3-dimensional skeletal structure and the reproduction conditions and simultaneously reproducing the audio data stream and the motion data stream synchronously with each other.

17. A recording medium readable by a computer connectable with the Internet, for recording a program that causes the computer to execute a process of transmitting and receiving a plurality of data streams representing 3-dimensional virtual space, in which a shape data stream, a motion data stream and an audio data stream respectively representing a shape and a motion of a skeletal structure in 3-dimensional computer graphics (3-DCG) and a sound synchronous with the motion, are transmitted from a transmitting system to a receiving system such that the receiving system generates the 3-DCG through synchronization of the motion data stream and the audio data stream, the computer executed process comprising:

simultaneously transmitting, on a real-time basis in response to a request from the receiving system, the shape data stream, the motion data stream and the audio data stream synchronous with the motion data stream as the plurality of streams in accordance with a predetermined format, the motion data stream comprising time series rotational angle data, time series positional data, and time series vector data;

connecting the transmitting system and the receiving system in a bidirectional manner to transfer the plurality of streams from the transmitting system to the receiving system interactively;

receiving the plurality of streams on a real-time basis to discriminate kinds and formats of the received streams and to subject the discriminated streams to respective restoration processings;

generating the shape of the skeletal structure in the 3-dimensional virtual space based on one of the restored shape stream and 3-dimensional shape data read preliminarily, and moving the shape of the skeletal structure based on the restored motion stream of the plurality of streams; and reproducing the sound synchronously with the motion data stream based on the restored audio data stream.

18. A transmitting system for use in an apparatus for transmitting and receiving a plurality of data streams representing 3-dimensional virtual space, the apparatus comprising a receiving system and a transfer system, for connecting the transmitting system and the receiving system in a bidirectional manner, wherein a shape data stream, a motion data stream and an audio data stream, respectively representing a shape and a motion of a skeletal structure in 3-dimensional computer graphics (3-DCG) and a sound synchronous with the motion, are transmitted to the receiving system from the transmitting system such that the receiving system generates the 3-DCG through synchronization of the motion data stream and the audio data stream, the transmitting system comprising:

a transmitter portion that simultaneously transmits, on real-time basis in response to a request from the receiving system, the plurality of data streams, comprising the shape data stream, the motion data stream and the audio data stream synchronous with the motion data stream, in accordance with a predetermined format, the motion data stream comprising time series rotational angle data, time series positional data, and time series vector data, such that the transfer system interactively transfers the plurality of data streams from the transmitting system to the receiving system.

19. A receiving system for use in an apparatus for transmitting and receiving a plurality of data streams representing 3-dimensional virtual space, the apparatus comprising a transmitting system and a transfer system for connecting the transmitting system and the receiving system in a bidirectional manner, wherein a shape data stream, a motion data stream and an audio data stream, respectively representing a shape and a motion of a skeletal structure in 3-DCG and a sound synchronous with the motion, are transmitted to the receiving system from the transmitting system such that the receiving system generates the 3-DCG through synchronization of the motion data stream and the audio data stream;

wherein the transmitting system simultaneously transmits, on a real-time basis in response to a request from the receiving system, the shape data stream, the motion data stream and the audio data stream synchronous with the motion data stream as the plurality of data streams in accordance with a predetermined format, the motion data stream comprising time series rotational angle data, time series positional data, and time series vector data, such that the transfer system interactively transfers the plurality of data steams from the transmitting system to the receiving system;

the receiving system comprising:

a data stream receiver portion that receives the plurality of data streams transmitted from the transmitting system via the transfer system so as to discriminate kinds and formats of the received plurality of data streams, receiving the plurality of streams as necessary on a real-time basis to subject the discriminated streams to respective restoration processings;

a 3-dimensional virtual space generating portion that generates the shape of the skeletal structure in the 3-dimensional virtual space using the shape data stream or 3-dimensional shape data read preliminarily and moves the shape of the skeletal structure using the motion data stream; and a sound generating portion that reproduces the sound using the audio data stream synchronously with the motion data stream.

* * * * *